United States Patent
Hahn et al.

(10) Patent No.: US 9,736,743 B2
(45) Date of Patent: Aug. 15, 2017

(54) METHOD OF USER EQUIPMENT SELECTING CELL IN WIRELESS COMMUNICATION SYSTEM AND USER EQUIPMENT USING THE METHOD

(71) Applicants: LG ELECTRONICS INC., Seoul (KR); Industry-Academic Cooperation Foundation, Yonsei University, Seoul (KR)

(72) Inventors: Genebeck Hahn, Seoul (KR); Jingu Choi, Seoul (KR); Seonglyun Kim, Seoul (KR); Beomhee Lee, Seoul (KR); Jaehoon Chung, Seoul (KR); Eunjong Lee, Seoul (KR)

(73) Assignees: LG ELECTRONICS INC., Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 125 days.

(21) Appl. No.: 14/652,052

(22) PCT Filed: Dec. 12, 2013

(86) PCT No.: PCT/KR2013/011523
§ 371 (c)(1),
(2) Date: Jun. 12, 2015

(87) PCT Pub. No.: WO2014/092477
PCT Pub. Date: Jun. 19, 2014

(65) Prior Publication Data
US 2015/0334616 A1      Nov. 19, 2015

Related U.S. Application Data

(60) Provisional application No. 61/736,546, filed on Dec. 13, 2012.

(51) Int. Cl.
*H04W 36/04* (2009.01)
*H04W 8/18* (2009.01)
(Continued)

(52) U.S. Cl.
CPC ............. *H04W 36/04* (2013.01); *H04W 8/18* (2013.01); *H04W 48/20* (2013.01); *H04W 48/04* (2013.01)

(58) Field of Classification Search
None
See application file for complete search history.

(56) References Cited

U.S. PATENT DOCUMENTS 8,000,258 B2 * 8/2011 Ko ................ H04B 7/0413
370/230
8,194,558 B2 * 6/2012 Choi ................ H04L 1/0016
370/252

(Continued)

FOREIGN PATENT DOCUMENTS

SE   WO 2015082327 A1 * 6/2015 .......... H04W 28/048
WO       2011/122833      10/2011

OTHER PUBLICATIONS

PCT International Application No. PCT/KR2013/011523, Written Opinion of the International Searching Authority dated Mar. 27, 2014, 1 page.

*Primary Examiner* — Ayaz Sheikh
*Assistant Examiner* — Faiyazkhan Ghafoerkhan
(74) *Attorney, Agent, or Firm* — Lee Hong Degerman Kang & Waimey (57) ABSTRACT

Provided are a cell selection method performed by UE in a wireless communication system and UE using the method. The method includes generating data use pattern information, the data use pattern information including an amount of data used for each moving speed of the UE, receiving data providing pattern information that informs an amount of (Continued)

data provided by the wireless communication system for each specific moving speed of the UE, determining an access type of the UE based on the data use pattern information and the data providing pattern information, selecting a type of a cell to be accessed according to the access type and selecting a cell from cells having the cell type.

7 Claims, 7 Drawing Sheets (51) Int. Cl.
  *H04W 48/20* (2009.01)
  *H04W 48/04* (2009.01)

(56) References Cited

U.S. PATENT DOCUMENTS

| | | | |
|---|---|---|---|
| 2001/0019309 A1* | 9/2001 | Saeki | G01C 21/32 340/995.1 |
| 2004/0053626 A1* | 3/2004 | Yagi | H04W 36/32 455/456.1 |
| 2006/0234757 A1* | 10/2006 | Choi | H04W 36/32 455/525 |
| 2008/0219216 A1* | 9/2008 | Taaghol | H04W 36/04 370/331 |
| 2009/0023392 A1* | 1/2009 | Iizuka | H04B 1/7113 455/65 |
| 2009/0059844 A1* | 3/2009 | Ko | H04B 7/0413 370/328 |
| 2009/0219893 A1 | 9/2009 | Korpela et al. | |
| 2009/0247161 A1* | 10/2009 | Pani | H04W 36/0072 455/435.3 |
| 2010/0135176 A1 | 6/2010 | Kazmi et al. | |
| 2010/0142486 A1* | 6/2010 | Wahlqvist | H04W 72/0406 370/332 |
| 2010/0159950 A1* | 6/2010 | Toh | H04J 11/0086 455/456.1 |
| 2010/0234061 A1* | 9/2010 | Khandekar | H04W 52/146 455/522 |
| 2010/0309793 A1* | 12/2010 | Choi | H04L 1/0016 370/252 |
| 2011/0038284 A1 | 2/2011 | Senarath et al. | |
| 2011/0124330 A1* | 5/2011 | Kojima | H04W 36/32 455/424 |
| 2011/0142008 A1* | 6/2011 | Choi | H04W 36/04 370/332 |
| 2011/0287768 A1* | 11/2011 | Takamatsu | H04W 36/04 455/444 |
| 2011/0305155 A1* | 12/2011 | Goto | H04W 72/085 370/252 |
| 2012/0094679 A1* | 4/2012 | Rao | H04W 48/16 455/450 |
| 2012/0122515 A1* | 5/2012 | Han | H04W 36/32 455/525 |
| 2012/0184317 A1* | 7/2012 | Ihm | H04L 5/0048 455/509 |
| 2012/0196634 A1* | 8/2012 | Ogawa | H04B 7/024 455/501 |
| 2012/0238261 A1* | 9/2012 | Mildh | H04W 72/0406 455/425 |
| 2012/0307927 A1* | 12/2012 | Nammi | H04B 17/27 375/267 |
| 2012/0314588 A1* | 12/2012 | Nammi | H04L 1/0027 370/252 |
| 2014/0141785 A1* | 5/2014 | Wang | H04W 36/32 455/441 |
| 2014/0194117 A1* | 7/2014 | Jeong | H04W 36/32 455/434 |
| 2015/0111594 A1* | 4/2015 | Cui | H04W 28/08 455/453 |
| 2015/0141013 A1* | 5/2015 | Cui | H04W 48/20 455/436 |
| 2015/0172972 A1* | 6/2015 | Pani | H04W 36/0072 370/331 |

* cited by examiner

FIG. 7 ously abbreviated as 'cell selection') process is a process in which user equipment searches for a cell (or base station) from which service will be received and selecting a retrieved cell. An object of cell selection is to register the user equipment with a network in order to receive service from the base station.

METHOD OF USER EQUIPMENT SELECTING CELL IN WIRELESS COMMUNICATION SYSTEM AND USER EQUIPMENT USING THE METHOD

CROSS-REFERENCE TO RELATED APPLICATIONS

This application is the National Stage filing under 35 U.S.C. 371 of International Application No. PCT/KR2013/011523, filed on Dec. 12, 2013, which claims the benefit of U.S. Provisional Application No. 61/736,546, filed on Dec. 13, 2012, the contents of which are all hereby incorporated by reference herein in their entirety.

BACKGROUND OF THE INVENTION

Field of the Invention

The present invention relates to wireless communication and, more particularly, to a method of user equipment performing cell selection in a wireless communication system and user equipment using the method.

Related Art

A wireless communication system divides its coverage into a plurality of cells and provides communication service in order to overcome the limitations of the coverage and the limited accommodation capacity of users.

A cell search and selection (hereinafter abbreviated as 'cell selection') process is a process in which user equipment searches for a cell (or base station) from which service will be received and selecting a retrieved cell. An object of cell selection is to register the user equipment with a network in order to receive service from the base station.

A conventional cell selection process is to search for a cell having the strongest reception signal strength, of all frequency bands that may be searched for by user equipment, through a signal strength measurement process. For example, user equipment may search for a cell having the strongest signal feature value based on Reference Signal Received Power (RSRP) or a Received Signal Strength Indicator (RSSI) and select a cell to be accessed by checking whether or not the cell is the network of an operator to which the user equipment belongs.

The type and characteristics of service traffic and applications which can be used over a wireless network become diverse.

Accordingly, the wireless data use pattern of user equipment also becomes diverse. For example, user equipment which uses a large amount of data and user equipment which use a small amount of data may be simultaneously present in the same network. Furthermore, a data pattern used by the same user equipment may vary depending on the place and current speed.

If user equipment has a different data use pattern, a network may preferably provide the user equipment with service suitable for the data use pattern of the user equipment. In this case, a network can be efficiently managed, and the user equipment can also be provided with desired service.

However, a conventional cell selection process has an efficient problem because a cell is selected on the basis of only the strength of a received signal by not taking a data use pattern of user equipment into consideration.

Furthermore, there have been proposed methods using different cell access depending on the speed of user equipment. However, the methods are problematic in that it is difficult to clearly measure the speed of user equipment and a data use pattern is not taken into consideration.

SUMMARY OF THE INVENTION

An object of the present invention is to provide a method of selecting, by user equipment, a cell in a wireless communication system and user equipment using the method.

In an aspect, a cell selection method performed by User Equipment (UE) in a wireless communication system is provided. The method comprises generating data use pattern information, the data use pattern information comprising an amount of data used for each moving speed of the UE, receiving data providing pattern information that informs an amount of data provided by the wireless communication system for each specific moving speed of the UE, determining an access type of the UE based on the data use pattern information and the data providing pattern information, selecting a type of a cell to be accessed according to the access type, and selecting a cell from cells having the cell type.

The data use pattern information may indicate the moving speed of the UE using one of a predetermined number of speed sections and indicates the amount of data used by the UE in the indicated speed section.

The data use pattern information may comprise curvature of a secondary curve indicative of the amount of data used for each moving speed of the UE and a value indicative of a scale of the secondary curve.

The cell type may comprise a macro cell and a small cell, and coverage of the macro cell may be greater than coverage of the small cell.

The access type may be determined by comparing a moving speed of the UE, the amount of data used by the UE at the moving speed, and an amount of data provided by the wireless communication system at the moving speed with each other.

If the amount of data used by the UE at the moving speed is equal to or smaller than the amount of data provided by the wireless communication system at the moving speed, the selected cell type may comprise both the macro cell and the small cell.

If the amount of data used by the UE at the moving speed is greater than the amount of data provided by the wireless communication system at the moving speed and the moving speed is smaller than a predetermined value, the selected cell type may comprise both the macro cell and the small cell.

If the amount of data used by the UE at the moving speed is greater than the amount of data provided by the wireless communication system at the moving speed and the moving speed is a predetermined value or more, the selected cell type may comprise only the macro cell.

The method may further comprise receiving information about a number of UEs that have accessed each cell in the wireless communication system and user patterns of the accessed UEs.

In other aspect, a user equipment is provided. The user equipment comprises a Radio Frequency (RF) unit configured to send or receive radio signals; and a processor connected to the RF unit, wherein the processor is configured to: generate data use pattern information, the data use pattern information comprising an amount of data used for each moving speed of the UE; receive data providing pattern information that informs an amount of data provided by a wireless communication system for each specific moving speed of the UE; determine an access type of the UE based on the data use pattern information and the data providing pattern information; select a type of a cell to be accessed according to the access type; and select a cell from cells having the cell type.

In a heterogeneous network in which a macro cell and small cells coexist, a suitable cell can be selected by taking a data use pattern of user equipment into consideration. Accordingly, cell selection/reselection can be performed more efficiently.

DESCRIPTION OF EXEMPLARY EMBODIMENTS

The following technology can be used in a variety of multiple access schemes, such as Code Division Multiple Access (CDMA), Frequency Division Multiple Access (FDMA), Time Division Multiple Access (TDMA), Orthogonal Frequency Division Multiple Access (OFDMA), and Single Carrier-Frequency Division Multiple Access (SC-FDMA). CDMA can be implemented using radio technology, such as Universal Terrestrial Radio Access (UTRA) or CDMA2000. TDMA can be implemented by radio technology, such as Global System for Mobile communications (GSM)/General Packet Radio Service (GPRS)/Enhanced Data Rates for GSM Evolution (EDGE). OFDMA can be implemented by radio technology, such as IEEE 802.11 (Wi-Fi), IEEE 802.16 (WiMAX), IEEE 802.20, or Evolved UTRA (E-UTRA). IEEE 802.16m is the evolution of IEEE 802.16e, and it provides backward compatibility with a system based on IEEE 802.16e. UTRA is part of a Universal Mobile Telecommunications System (UMTS). $3^{rd}$ Generation Partnership Project (3GPP) Long Term Evolution (LTE) is part of an Evolved UMTS (E-UMTS) using Evolved-UMTS Terrestrial Radio Access (E-UTRA). 3GPP LTE adopts OFDMA in downlink and adopts SC-FDMA in uplink. LTE-Advanced (A) is the evolution of 3GPP LTE.

Figure 1:
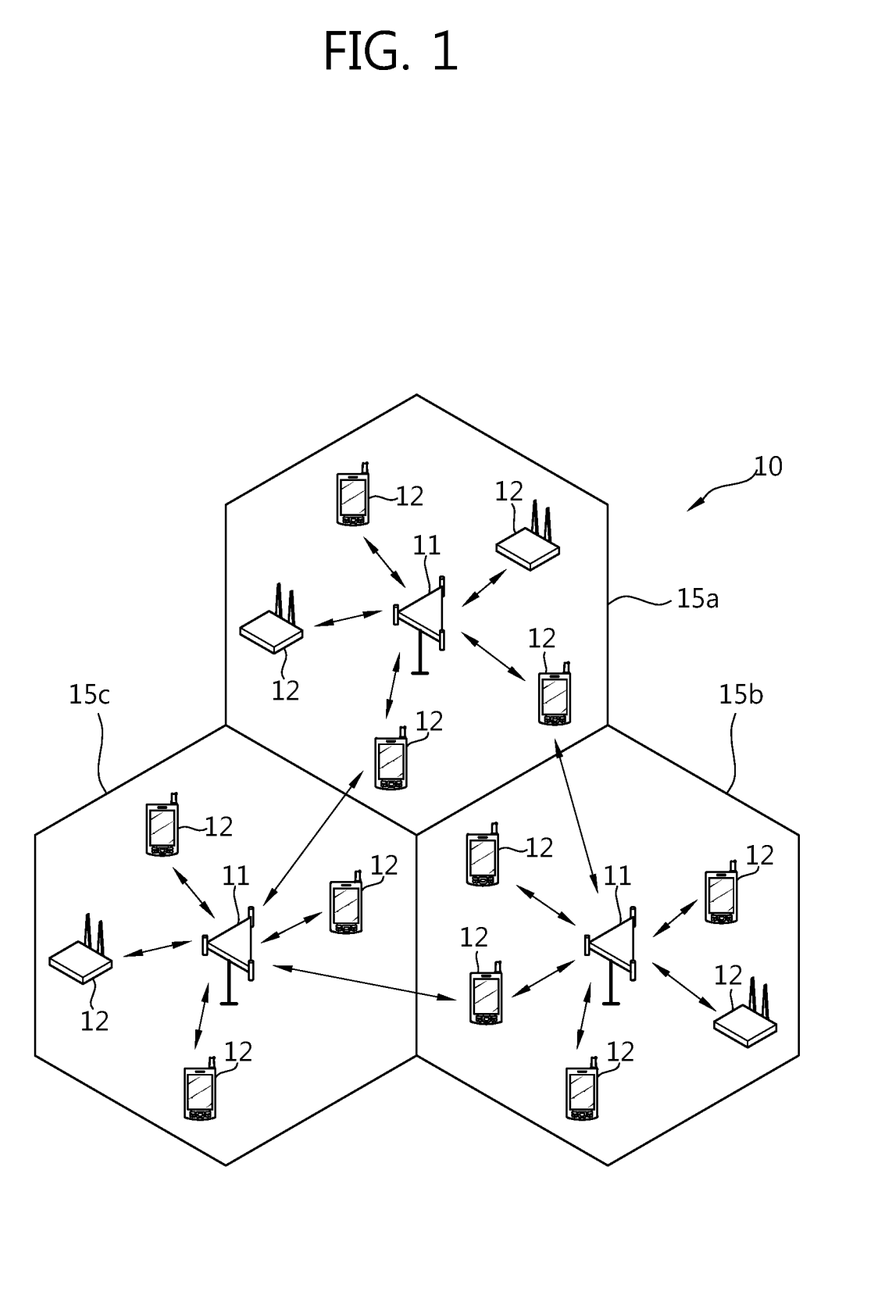
FIG. 1 shows a wireless communication system.

FIG. 1 shows a wireless communication system.

The wireless communication system 10 includes one or more Base Stations (BSs) 11. The BSs 11 provide communication services to respective geographical areas (commonly called cells) 15a, 15b, and 15c. Each of the cells may be divided into a plurality of areas (also called sectors). User Equipment (UE) 12 may be fixed or mobile. It is hereinafter assumed that UE has mobility. UE may also be called another term, such as a Mobile Station (MS), a Mobile Terminal (MT), a User Terminal (UT), a Subscriber Station (SS), a wireless device, a Personal Digital Assistant (PDA), a wireless modem, or a handheld device. The BS 11 commonly refers to a fixed station communicating with the UEs 12, and it may also be called another term, such as an evolved NodeB (eNB), a Base Transceiver System (BTS), or an access point.

UE commonly belongs to one cell. The cell to which the UE belongs is called a serving cell. A BS that provides the serving cell with communication service is called a serving BS. A serving BS can provide one serving cell or a plurality of serving cells. Another cell that neighbors a serving cell is called a neighbor cell.

In general, downlink refers to communication from the BS 11 to the UE 12, and uplink refers to communication from the UE 12 to the BS 11.

The layers of a radio interface protocol between the UE 12 and the BS 11 may be classified into L1 (a first layer), L2 (a second layer), and L3 (a third layer) on the basis of the three lower layers of an Open System Interconnection (OSI) which has been widely known in the communication systems.

A physical layer, that is, the first layer, is connected to a Medium Access Control (MAC) layer placed at a high position through a transport channel. Data is moved between the MAC layer and the physical layer through the transport channel. Furthermore, data is moved through a physical channel between different physical layers, that is, between physical layers on the transmission side and the reception side.

A radio data link layer, that is, the second layer, includes a MAC layer, an RLC layer, and a PDCP layer. The MAC layer is a layer that is responsible for mapping between a logical channel and a transport channel. The MAC layer selects a proper transport channel in order to send data transferred from the RLC layer and adds necessary control information to the header of a MAC Protocol Data Unit (PDU).

The RLC layer is placed at a high position of the MAC layer, and it supports the reliable transmission of data. Furthermore, the RLC layer segments RLC Service Data Units (SDUs) transferred from a higher layer in order to configure data having a size suitable for a radio section and concatenates the segmented SDUs. The RLC layer of a receiver supports a data reassembly function in order to recover original RLC SDUs from received RLC PDUs.

The PDCP layer is used only in a packet exchange region, and it can compress and send the header of an IP packet so that the transmission efficiency of packet data in a radio channel can be increased.

The RRC layer, that is, the third layer, functions to control lower layers and also exchange pieces of radio resource control information between UE and a network. A variety of RRC states, such as idle mode and RRC connected mode, are defined depending on the communication state of UE, and the RRC states can be changed according to circumstances. A variety of procedures related to the management of radio resources, such as system information broadcasting, an RRC access management procedure, a multi-component carrier configuration procedure, a radio bearer control procedure, a security procedure, a measurement procedure, and a mobility management procedure (handover), are defined in the RRC layer.

The wireless communication system may be any one of a Multiple-In Multiple-Out (MIMO) system, a Multiple Input Single Output (MIMO) system, a Single Input Single Output (SISO) system, and a Single Input Multiple Output (SIMO) system. The MIMO system uses a number of transmit antennas and a number of receive antennas. The MISO system uses a number of transmit antennas and one receive antenna. The SISO system uses one transmit antenna and one receive antenna. The SIMO system uses one transmit antenna and a number of receive antennas.

Although not shown in FIG. 1, a wireless communication system may further include an apparatus for managing a plurality of BSs. The apparatus is called a Cloud-Radio Access Network (C-RAN).

For communication with a BS, UE performs cell search and selection. The UE finds a BS with which the UE will communicate through such a process. In a conventional cell search process, a cell that sends the greatest signal strength is found using Reference Signal Received Power (RSRP) or a Received Signal Strength Indicator (RSSI). In such a process, UE checks whether or not a cell is a cell included in the network of an operator to which the UE belongs through a Public Mobile Network Identity (PLMN) and may perform access to the cell if the retrieved cell is found to be a suitable cell. A PLMN can be obtained through a System Information Block (SIB) type 1 that is periodically transmitted by a cell.

A wireless communication system may include a heterogeneous network. The heterogeneous network refers to a network which includes a macro cell and a plurality of small cells. The macro cell may mean a BS which supports a plurality of UEs and which has great transmission power and wide coverage, and the small cell may mean a BS which includes a smaller number of supportable UEs than that of a macro cell and which has small transmission power and narrow coverage. That is, in a heterogeneous network, cells may have different coverage, transmission power, and capacities. In a heterogeneous network, if cell access is performed on the basis of only received signal strength as in the prior art, a problem arises.

For example, if UE placed in the coverage of a small cell selects a cell on the basis of only received signal strength, there is a high probability that a small cell will be selected. If UE moves at high speed, the UE will get out of the coverage of the small cell within a short time. As a result, the UE will need to perform handover to another cell. Accordingly, from a long-term viewpoint, it may be efficient if UE selects a macro cell having wide coverage although the macro cell has weak received signal strength rather than selecting a small cell having the strongest received signal strength. That is, in a cell selection/reselection process, it is necessary to take the moving speed of UE into consideration.

Furthermore, in a cell selection/reselection process, the amount of data used by UE also needs to be taken into consideration. For example, since there is a high probability that UE using a small amount of data will use the data only within a short time, it may be efficient for the UE to select a cell from which service can be received most smoothly.

In contrast, since there is a high probability that UE using a large amount of data will use the data for a long time, it may be efficient for the UE to select a cell from which a higher data rate can be provided. For example, a cell that provides service to a large number of UEs at a specific point of time may allocate more resources to specific UE for a long term if UEs that have accessed the cell use less data although the cell may not allocate many resources to the specific UE at the specific point of time.

Accordingly, the present invention proposes a method of determining the data use pattern of UE by taking both moving speed of the UE and the amount of data used by the UE into consideration and performing cell selection based on the determined data use pattern.

The data providing pattern of a BS can also be used in the method. The data providing pattern may be a pattern in which the amount of data that can be provided from a BS to UE is indicated based on each speed of UE. Information that informs a data providing pattern is called 'data providing pattern information'. A BS can estimate the amount of data that can be provided to UE that will access the BS by analyzing the number of UEs served by the BS, the required amount of data of each UE, etc. and may inform UE of the estimated amount of data through data providing pattern information.

Figure 2:
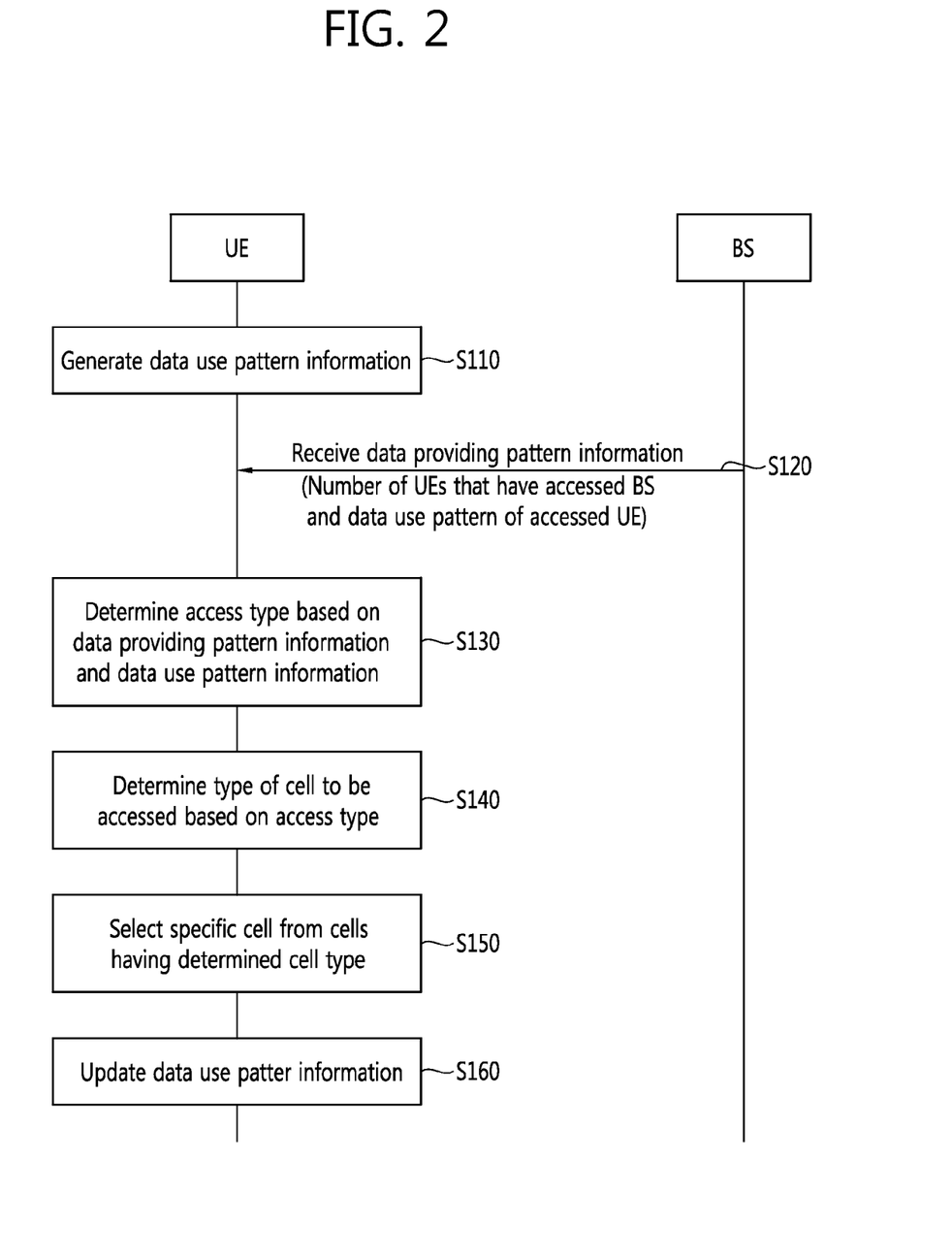
FIG. 2 is an operating method of UE in accordance with an embodiment of the present invention.

FIG. 2 is an operating method of UE in accordance with an embodiment of the present invention.

Referring to FIG. 2, the UE generates data use pattern information at step S110.

The data use pattern information and a process of generating the data use pattern information are described in detail later.

The UE receives data providing pattern information from a BS at step S120.

The data providing pattern information can be generated based on the number of UEs that have accessed the BS, a data use pattern of the accessed UE, etc.

The UE determines an access type based on the data providing pattern information and the data use pattern information at step S130 and determines the type of cell to be accessed according to an access type at step S140.

The UE selects a specific cell from cells having the determined cell type at step S150 and accesses the specific cell. Thereafter, the UE updates the data use pattern information at step S160.

Each of the steps of the method is described in detail below.

[Method of Generating Information about Data Use Pattern of UE]

UE can record the amount of data used by the UE for a specific time T1 and moving speed at that time. The following table shows a list of moving speed of UE for a specific time and the amount of data used by the UE at the moving speed. In Table, it is assumed that the UE can calculate precise moving speed.

TABLE 1

| MOVING SPEED OF UE | AMOUNT OF DATA USED (KBYTES) |
|---|---|
| V1 | 101 |
| V3 | 21.2 |
| ... | ... |
| V1 | 30.4 |

It may be difficult for UE to precisely measure its instant speed and the accuracy of the measured speed may not be guaranteed. Accordingly, the speed of UE may be determined in such a way as to classify the speed into some sections and check that the UE belongs to which speed section. For example, the speed section may be classified into three sections as in Table 2 below.

TABLE 2

| PARAMETER VALUE | SPEED SECTION[Km/h] |
|---|---|
| $V_1$ | $V = 0$ |
| $V_2$ | $0 < V < V_{th}$ |
| $V_3$ | $V_{th} < V$ |

It is assumed that moving speed of UE is V. If V=0, the UE records a parameter value $V_1$ on the list. If V is greater than 0 and is smaller than $V_{th}$, that is, a specific threshold value, the UE records a parameter value $V_2$ on the list. The specific threshold value may be set to the mean moving speed of a vehicle, for example. That is, if the UE has a pedestrian's moving speed, the UE may record the parameter value $V_2$ on the list. If V is greater than $V_{th}$, the UE records a parameter value $V_3$ on the list. Furthermore, the UE also records the amount of data used in each hour on the list.

Values recorded on the list are valid for a predetermined time. After the values are recorded on the list, the values may be removed from the list after a lapse of the predetermined time and updated.

Figure 3:
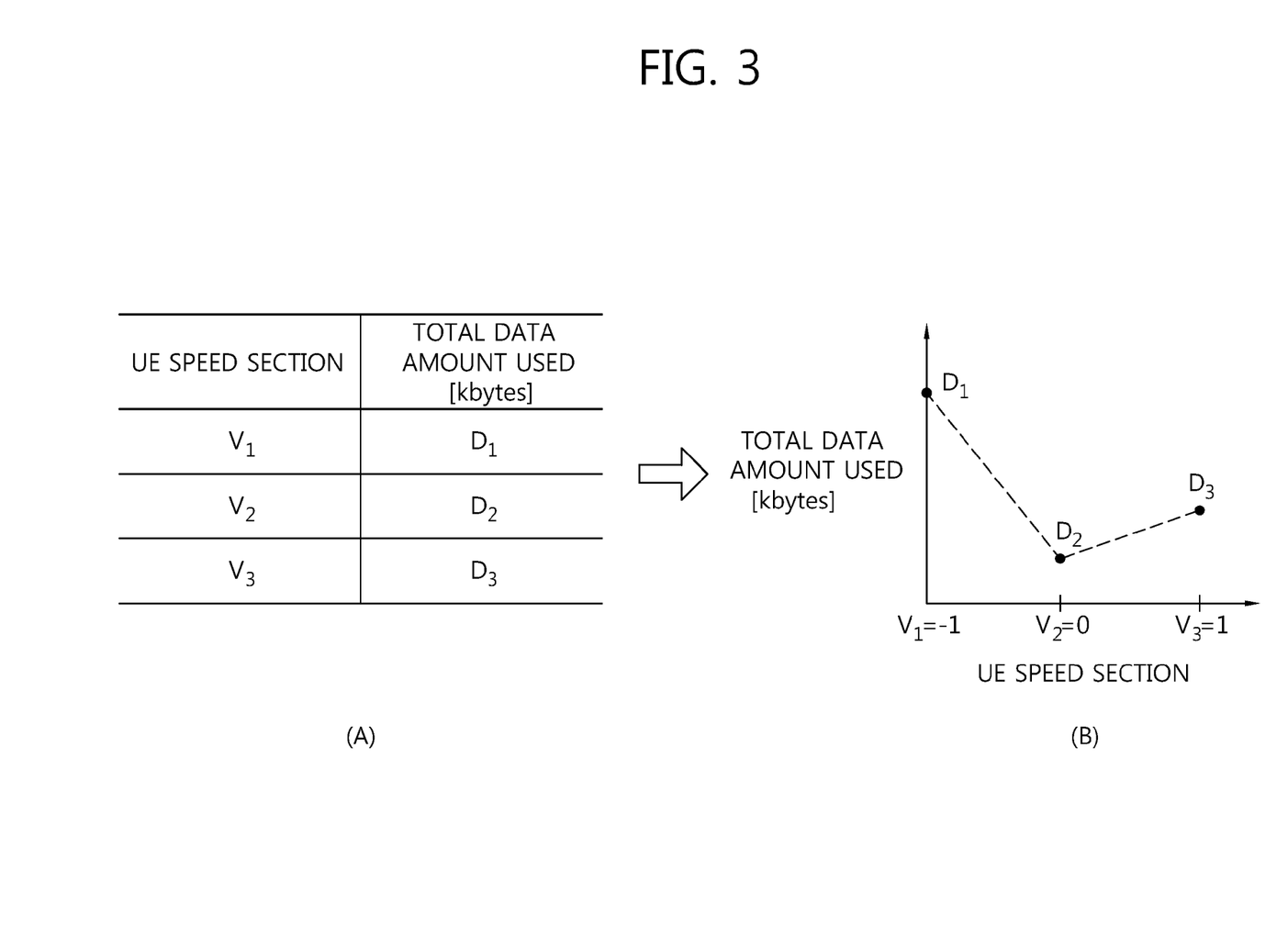
FIG. 3 shows an example of a list and graph showing the amount of data used in each speed section of UE for a specific time.

FIG. 3 shows an example of a list and graph showing the amount of data used in each speed section of UE for a specific time.

Referring to FIG. 3(A), UE may use data $D_1$ at speed $V_1$, may use data $D_2$ at speed $V_2$, and may use data $D_3$ at speed $V_3$. In this case, a list can be generated as in FIG. 3(A).

Such a list shows the amount of data used in each speed of UE. The list can be provided to a BS as data use pattern information for the UE.

Meanwhile, the three types of speed $V_1$, $V_2$, and $V_3$ and the three amounts of data used $D_1$, $D_2$, and $D_3$ in the list may be indicated on coordinates in which the speed of UE is an X axis and the amount of data used by the UE is a Y axis as in FIG. 3(B).

In this case, a secondary curve that passes through the three points may be present, and data use pattern information may be given as the feature value of the secondary curve. In other words, a feature value of a secondary curve that connects points indicative of the amounts of data used by the speeds of each UE can be provided to a BS as data use pattern information.

Figure 4:
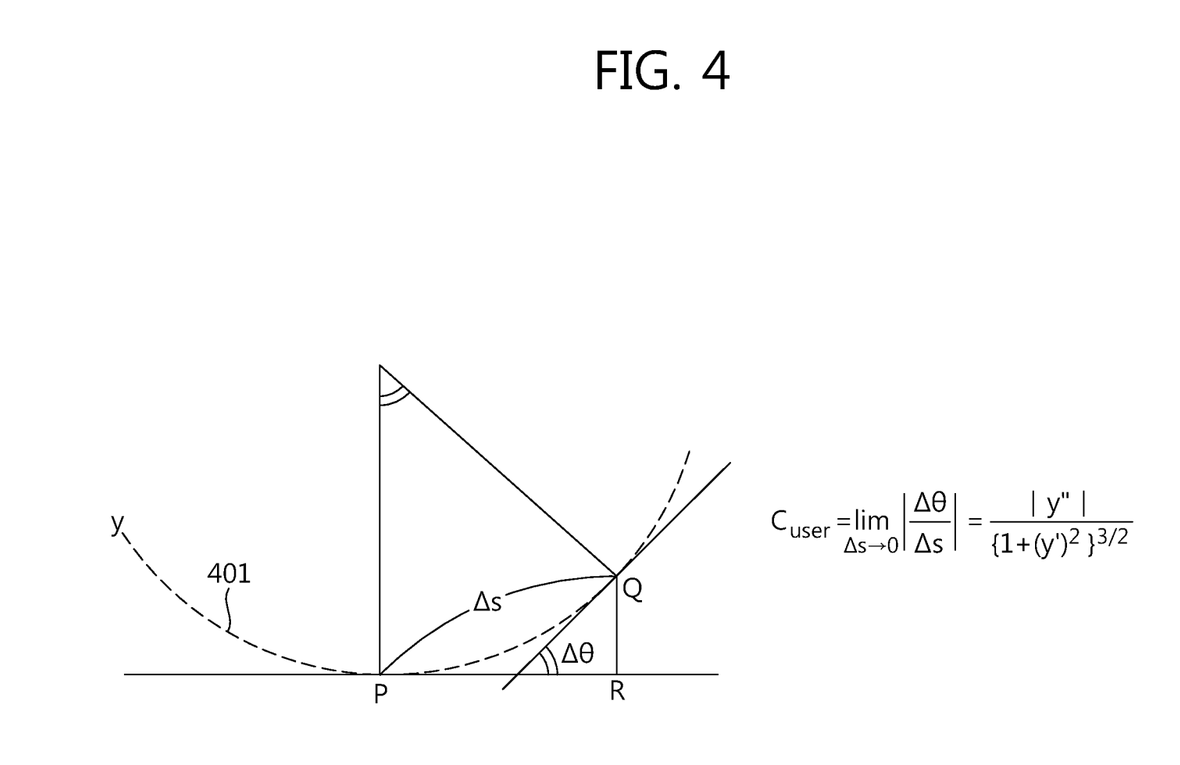
FIG. 4 shows an example in which data use pattern information is determined.

FIG. 4 shows an example in which data use pattern information is determined.

Referring to FIG. 4, it is assumed that a secondary curve 401 that passes through three points is y. Curvature at a point R of the secondary curve 'y' can be defined as in $C_{user}$ of FIG. 4. In general, the secondary curve 401, together with the curvature, can be specified by a value indicative of a scale (hereinafter referred to as a 'scale value'). If the scale value is $r_{user}$, the value $D_2$ of FIG. 3 (A) may be used as $r_{user}$.

That is, data use pattern information may be provided in the form of a list that indicates the amount of data used for each speed as in FIG. 3(A) or may be provided through the curvature $C_{user}$ of the secondary curve, including the points indicated by the values of the list as described with reference to FIG. 4, and the scale value $r_{user}$.

[Data Providing Pattern Information]

A BS may receive the amount of data used for each speed from UEs that the BS provide service and calculate the amount of data for each speed that may be provided to UE that will access the BS. The amount of data that may be provided for each speed may be provided in the form of a list or as a feature value of a secondary curve.

If data providing pattern information provided by a BS is a feature value of a secondary curve, the data providing pattern information may be provided in the form of ($C_{sys}$, $r_{sys}$). $C_{sys}$ may be a curvature value of the secondary curve, and $r_{sys}$ may be a scale value of the secondary curve.

[Use of Data Use Pattern and Data Providing Pattern of System]

UE can determine an access type based on data providing pattern information and data use pattern information. The access type is described later.

For example, when sending data, UE can measure its own current speed section and estimate the average amount of data used by the UE in the current speed section using values $C_{user}$ and $r_{user}$ stored in the UE for a specific time.

For example, a secondary curve using $\delta_{user}$ (0<δ<½) as a symmetrical axis may be obtained using the values $C_{user}$ and $r_{user}$ so that the amount of data used by the UE can be estimated in a convex form, and the amount of data used in the current speed section may be estimated.

For example, the following equation may be used.

$$f(C_{user}, r_{user}, v) = \begin{cases} D'_1 = (1/2 + \delta)C_{user} + r_{user}, & v = 0 \\ D'_2 = r_{user}, & 0 < v < V_{th} \\ D'_3 = (1/2 - \delta)C_{user} + r_{user}, & V_{th} < v \end{cases} \quad \text{[Equation 1]}$$

Figure 5:
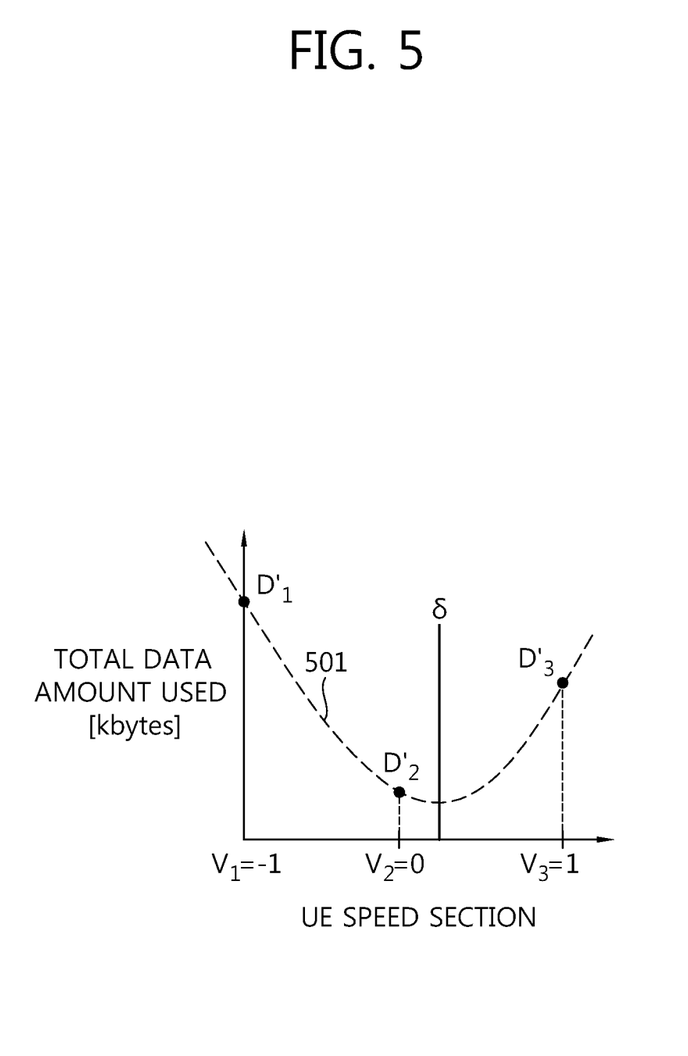
FIG. 5 shows an example of a graph in which UE estimates the amount of data used for each speed in a secondary curve.

FIG. 5 shows an example of a graph in which UE estimates the amount of data used for each speed in a secondary curve.

Referring to FIG. 5, the UE may obtain a secondary curve 501 using values $C_{user}$ and $r_{user}$ and estimate the amount of data used in each speed section. $D_1'$, $D_2'$, and $D_3'$ of FIG. 5 are the estimated amounts of data used in the speed sections.

If it is difficult to precisely measure current speed of UE, the current speed may be measured based on whether or not the UE has ridden on a vehicle. For example, whether or not UE has ridden on a vehicle may be checked using a tag previously installed in the vehicle and a tag recognizer installed in the UE, and whether or not current speed is a threshold speed or higher may be checked based on whether or not the UE has ridden on the vehicle.

Likewise, the amount of data that can be provided by a system in each speed section may be calculated using data providing pattern information (e.g., $C_{sys}$, $r_{sys}$, and $\delta_{sys}$) received from a BS.

[Determine Access Type of UE]

It is assumed that the current speed section of UE is $V_i$ and an estimated data use value at that speed is $D'_i$. In this case, an access type is determined by comparing the estimated data use value $D'_i$ with the amount of data $S_i$ that has been estimated as being able to be provided by a system in the current speed section $V_i$.

Figure 6:
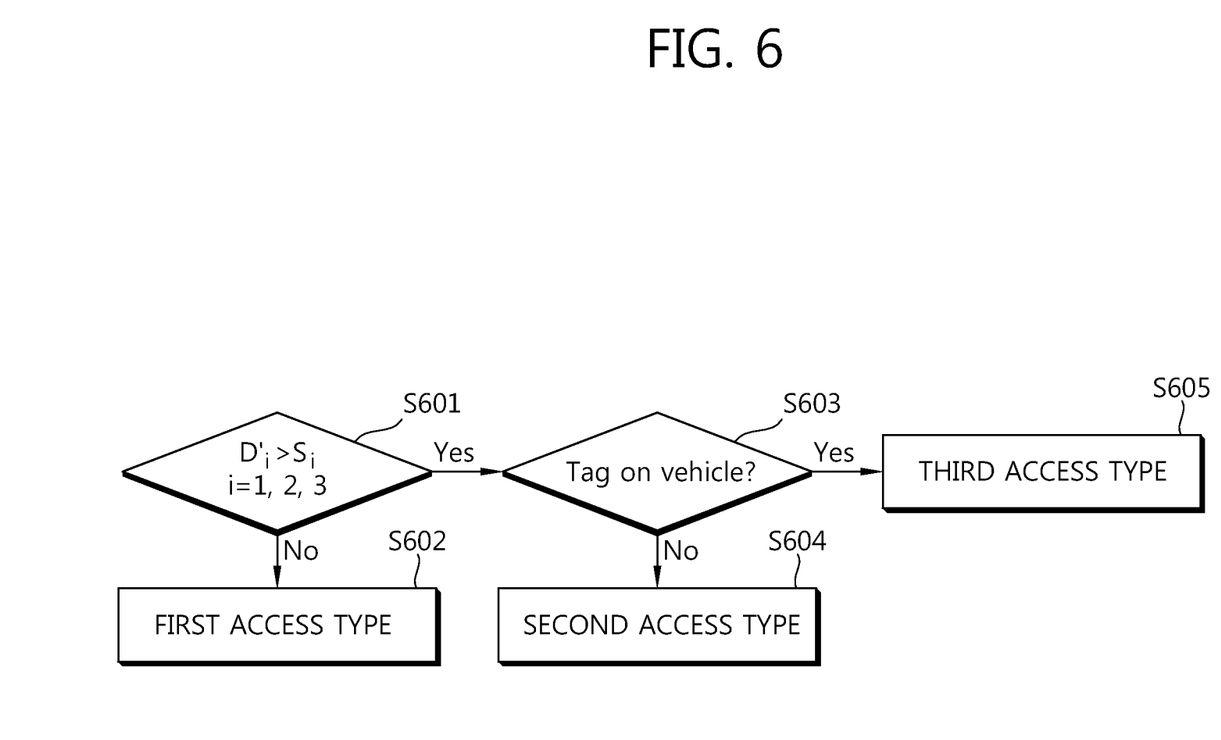
FIG. 6 shows an example in which an access type is determined.

FIG. 6 shows an example in which an access type is determined

Referring to FIG. 6, UE determines whether or not an estimated data use value $D'_i$ is greater than an estimated data providing amount $S_i$ at step S601. If, as a result of the determination, it is determined that the estimated data use value $D'_i$ is not greater than the estimated data providing amount $S_i$, the UE determines that an access type is a first access type at step S602. If, as a result of the determination at step S601, it is determined that the estimated data use value $D'_i$ is greater than the estimated data providing amount $S_i$, the UE determines whether or not the UE has ridden on a vehicle at step S603. If, as a result of the determination at step S602, it is determined that the UE has not ridden on the vehicle, the UE determines that an access type is a second access type at step S604. If, as a result of the determination at step S603, it is determined that the UE has ridden on the vehicle, the UE determines that an access type is a third access type at step S605.

[Method of Determining Type of Cell to be Accessed for Each Access Type]

If an access type is the first or second type, the UE selects both a macro cell and a small cell as an accessible candidate BS (or candidate cell).

If an access type is the third type, it may be considered that UE which uses a large amount of data moves at high speed. In this case, if the UE accesses a small cell, overhead may be frequently generated, resulting in performance attenuation. In order to avoid such a problem, a candidate BS (or candidate cell) to be accessed is limited to a macro cell.

[Method of Selecting Specific Cell of Cells Having Determined Cell Type]

A condition value $Q_i$ corresponding to each of candidate BSs that may be accessed is calculated, and a BS that provides the highest condition value $Q_i$ may be accessed.

An example in which the condition value $Q_i$ is calculated is described below.

$$\operatorname*{argmax}_{i \in S} Q_i = \quad \text{[Equation 2]}$$

$$w_1 \left( \frac{RSS_i}{\max_{i \in S}(RSS_i)} \right) + w_2 \left( \frac{B_i/n_i}{\max_{i \in S}(B_i/n_i)} \right) + w_3 \left( \frac{B_i/c_i}{\max_{i \in S}(B_i/c_i)} \right)$$

$$c_i = \sum_{j=1}^{n_i} f(C^j_{user}, r^j_{min}, v^j)/\gamma^j$$

$$w_1 + w_2 + w_3 = 1$$

In Equation 2, 'i' is a set of candidate BSs that may be accessed, and i∈S={1,2,3, . . . , N}. $RSS_i$ indicates signal strength received from an $i^{th}$ BS. $B_i$ indicates the bandwidth of the $i^{th}$ BS. $n_i$ indicates the number of uses that are now accessing the $i^{th}$ BS. $\gamma^j$ indicates the data rate of a $j^{th}$ user that has accessed the $i^{th}$ BS. $w_1$, $w_2$, and $w_3$ are weight values.

The steps of the method described with reference to FIG. 2 have been described in detail. UE determines an access type by comparing the amount of data used (it may be indicated by 'f($C_{user}$, $r_{user}$, and v)' and 'v' is current speed or speed section of the UE), estimated at current speed and based on data use pattern information, with the amount of data that can be provided (it may be indicated by 'f($C_{sys}$, $r_{sys}$, v)'), estimated at the current speed and based on data providing pattern information provided by a BS. Furthermore, the UE determines a proper cell type according to the determined access type and selects a specific cell from cells having the determined cell type.

If a serving cell is selected based on only signal strength as in the prior art in a heterogeneous network in which a macro cell and a plurality of small cells coexist, there is a high probability that a small cell closest to UE may be selected. If UE uses a large amount of data and moves at high speed, there is a high probability that the UE may experience a lot of handover while using data.

Accordingly, in the present invention, data use pattern information for UE that is statistically extracted for a specific time and data providing pattern information provided by a BS are used. That is, UE estimates the amount of data used at current speed using information about its data use pattern and estimates the amount of data provided at current speed using data providing pattern information. Thereafter, the UE determines its access type by comparing the estimated values with each other and selects a cell suitable for the determined access type. If a plurality of cells suitable for an access type is present, UE selects a specific cell by comparing conditions, such as Equation 2, with each other.

In accordance with the present invention, UE can select a suitable cell using its data use pattern and data providing pattern provided by a BS. As a result, Quality of Experience (QoE) of UE can be improved.

Figure 7:
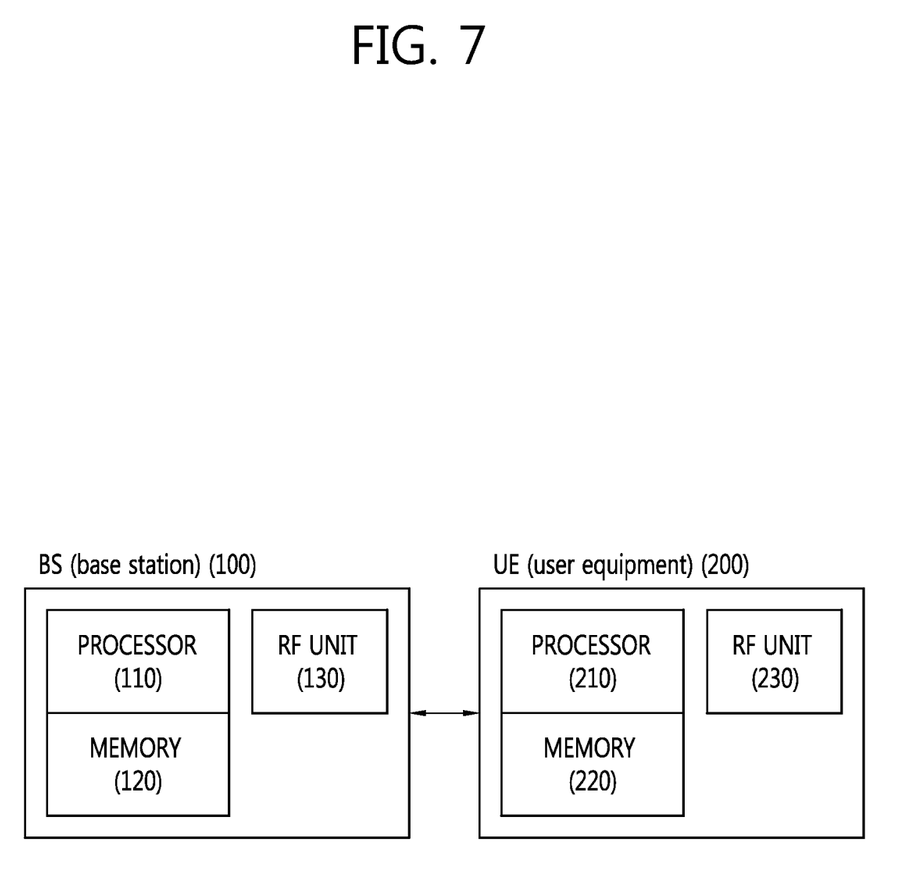
FIG. 7 is a block diagram illustrating a BS and UE in which the embodiments of the present invention are implemented.

FIG. 7 is a block diagram illustrating a BS and UE in which the embodiments of the present invention are implemented.

The BS 100 includes a processor 110, memory 120, and a Radio Frequency (RF) unit 130. The processor 110 implements the proposed functions, processes and/or methods. The layers of a wireless interface protocol can be implemented by the processor 110. The memory 120 is connected to the processor 110, and the memory 120 stores various pieces of information for driving the processor 110. The RF unit 130 is connected to the processor 110, and the RF unit 130 transmits and/or receives radio signals.

The UE 200 includes a processor 210, memory 220, and an RF unit 230. The processor 210 implements the proposed functions, processes and/or methods. The layers of a wireless interface protocol can be implemented by the processor 210. The memory 220 is connected to the processor 210, and the memory 220 stores various pieces of information for driving the processor 210. The RF unit 230 is connected to the processor 210, and the RF unit 230 transmits and/or receives radio signals to/from to a BS.

The processor 110, 210 may include Application-Specific Integrated Circuits (ASICs), other chipsets, logic circuits and/or data processors. The memory 120, 220 may include Read-Only Memory (ROM), Random Access Memory (RAM), flash memory, memory cards, storage media and/or other storage devices. The RF unit 130, 230 may include a baseband circuit for processing radio signals. When the above-described embodiment is implemented in software, the above-described scheme may be implemented using a module (process or function) that performs the above-described function. The module may be stored in the memory 120, 220 and executed by the processor 110, 210. The memory 120, 220 may be placed inside or outside the processor 110, 210 and connected to the processor 110, 210 using a variety of well-known means.

What is claimed is:

1. A method for cell selection in a wireless communication system, the method performed by a User Equipment (UE) and comprising:
   generating data use pattern information, comprising an amount of data used for the UE at a specific moving speed;
   receiving data providing pattern information which informs an amount of data provided by a base station (BS) at the specific moving speed;
   determining an access type of the UE at the specific moving speed based on the data use pattern information and the data providing pattern information, wherein the access type is determined based on the specific moving speed of the UE, the amount of data used for the UE, and the amount of data provided by the BS;
   selecting of a cell type to be accessed according to the access type, wherein the cell type comprises a macro cell and a small cell, and coverage of the macro cell is greater than coverage of the small cell; and
   selecting a cell among a plurality of cells having the cell type which is selected,
   wherein if the amount of data used for the UE at the specific moving speed is equal to or smaller than the amount of data provided by the BS at the specific moving speed, the cell type which is selected comprises both the macro cell and the small cell.

2. The method of claim 1, wherein the specific moving speed in the data use pattern information is indicated by one of a predetermined number of speed sections and the data use pattern information indicates the amount of data used for the UE in the indicated speed section.

3. The method of claim 1, wherein the data use pattern information comprises curvature of a secondary curve indicative of the amount of data used for the UE and a value indicative of a scale of the secondary curve.

4. The method of claim 1, wherein if the amount of data used for the UE at the specific moving speed is greater than the amount of data provided by the BS at the specific moving speed and the specific moving speed is smaller than a predetermined value, the selected cell type comprises both the macro cell and the small cell.

5. The method of claim 1, wherein if the amount of data used for the UE at the specific moving speed is greater than the amount of data provided by the BS at the specific moving speed and the specific moving speed is a predetermined value or more, the selected cell type comprises only the macro cell.

6. The method of claim 1, further comprising:
receiving information about a number of UEs that have accessed each cell in the wireless communication system and user patterns of the accessed UEs.

7. A user equipment (UE), the UE comprising:
a Radio Frequency (RF) unit that sends or receives radio signals; and
a processor connected to the RF unit,
wherein the processor is configured to:
generate data use pattern information comprising an amount of data used for the UE at a specific moving speed;
receive data providing pattern information which informs an amount of data provided by a base station (BS) at the specific moving speed;
determine an access type of the UE at the specific moving speed based on the data use pattern information and the data providing pattern information, wherein the access type is determined based on the specific moving speed of the UE, the amount of data used for the UE, and the amount of data provided by the BS;
select a cell type to be accessed according to the access type, wherein the cell type comprises a macro cell and a small cell, and coverage of the macro cell is greater than coverage of the small cell; and
select a cell among a plurality of cells having the cell type which is selected, wherein if the amount of data used for the UE at the specific moving speed is equal to or smaller than the amount of data provided by the BS at the specific moving speed, the cell type which is selected comprises both the macro cell and the small cell.

* * * * *